US012577958B2

(12) United States Patent
Romano

(10) Patent No.: US 12,577,958 B2
(45) Date of Patent: Mar. 17, 2026

(54) BLADE FOR AN INDUSTRIAL AXIAL FAN WITH TIP LIFT APPENDAGE

(71) Applicant: COFIMCO S.R.L, Pombia (IT)

(72) Inventor: Nicola Romano, Pombia (IT)

(73) Assignee: COFIMCO S.P.A., Pombia (IT)

( * ) Notice: Subject to any disclaimer, the term of this patent is extended or adjusted under 35 U.S.C. 154(b) by 0 days.

(21) Appl. No.: 18/843,124

(22) PCT Filed: Mar. 2, 2023

(86) PCT No.: PCT/IB2023/051951
§ 371 (c)(1),
(2) Date: Aug. 30, 2024

(87) PCT Pub. No.: WO2023/166461
PCT Pub. Date: Sep. 7, 2023

(65) Prior Publication Data

US 2025/0172158 A1 May 29, 2025

(30) Foreign Application Priority Data

Mar. 4, 2022 (IT) ........................ 102022000004106

(51) Int. Cl.
*F04D 29/38* (2006.01)

(52) U.S. Cl.
CPC ......... *F04D 29/384* (2013.01); *F04D 29/388* (2013.01); *F05D 2240/304* (2013.01); *F05D 2240/307* (2013.01)

(58) Field of Classification Search
None
See application file for complete search history.

(56) References Cited

U.S. PATENT DOCUMENTS 5,328,330 A * 7/1994 Monroe .................. F04D 29/38 416/62
8,079,823 B2 * 12/2011 Aynsley ................ F04D 29/384 416/243
9,011,099 B2 * 4/2015 Wortman ................ F01D 5/141 416/238
2008/0008596 A1 * 1/2008 Aynsley .................. F04D 29/34 416/243
2012/0003098 A1 * 1/2012 Lewis ................... F04D 29/388 416/223 R
2013/0336790 A1 * 12/2013 Wortman .............. F04D 29/384 416/170 R
2016/0206199 A1 7/2016 Blanco et al.
2022/0316493 A1 * 10/2022 Hsieh .................... F04D 29/325

FOREIGN PATENT DOCUMENTS

CN 203 161 650 8/2013
WO 2016/117413 A1 7/2016
WO 2020/188463 A1 9/2020

OTHER PUBLICATIONS

International Search Report and Written Opinion, European Patent Office, Application No. PCT/IB2023/05, Jun. 1, 2023.

* cited by examiner

*Primary Examiner* — Juan G Flores
(74) *Attorney, Agent, or Firm* — Gottlieb, Rackman & Reisman, PC

(57) ABSTRACT

A blade for an industrial axial fan includes an extruded or pultruded airfoil, having a leading edge, a trailing edge, a tip portion, an intrados and an extrados. A tip lift appendage is applied to the tip portion of the airfoil and projects beyond the trailing edge so as to form an extension of the airfoil in a downstream direction.

16 Claims, 7 Drawing Sheets

BLADE FOR AN INDUSTRIAL AXIAL FAN WITH TIP LIFT APPENDAGE

CROSS-REFERENCE TO RELATED APPLICATIONS

This Patent Application claims priority from Italian Patent Application No. 102022000004106 filed on Mar. 4, 2022 the entire disclosure of which is incorporated herein by reference.

TECHNICAL FIELD

The present invention relates to a blade for an industrial axial fan with tip lift appendage.

BACKGROUND

As is known, an industrial axial fan generally comprises a hub and a plurality of blades which substantially extend in a radial direction from the hub.

The hub is rotatable about an axis and is connected to an electric motor for receiving a rotary motion by a transmission system.

The blades are provided with an airfoil, so that, on account of the rotation impressed by the motor, a pressure difference is generated between extrados and intrados of the blades. In turn, the pressure difference produces an air flow in a direction substantially parallel to the axis of the hub.

The flow rate of air set into axial motion depends on various factors, mainly among which the rotation speed, the shape of the airfoil and the pitch angle of the blades.

Like in many sectors, also in the field of industrial fans efficiency is becoming an increasingly important requirement, also in the light of regulations which are tending to impose increasingly strict constraints.

Increasing the blade surface is not sufficient per se for guaranteeing better efficiency, and interventions on the pitch angles can even turn out to be counterproductive. The benefit of the lift increase deriving from a greater angle of incidence can, in fact, be annulled by the increase in aerodynamic drag, which imposes a greater power absorption.

In principle, the problem can be at least in part resolved by modifying the shape of the blades, so as to optimize the ratio between the lift and the aerodynamic drag. If similar solutions can, in principle, be advantageously exploited in the fans having small and medium dimensions, the blades of which are usually made by molding, the same does not occur for the large-dimension axial fans, normally having a diameter not less than a meter. In fact, the manufacturing processes of the blades of large-dimension industrial fans are mostly based on extrusion and/or pultrusion techniques, which are economically sustainable, besides providing the products with satisfactory characteristics of lightness and mechanical resistance, whereas the use of molding techniques is normally precluded mainly for the exceedingly high costs. On the other hand, the extrusion and pultrusion techniques entail specific problems because the obtainable products cannot be freely shaped. In fact, products made by extrusion and pultrusion through extruders have a substantially uniform and straight hollow structure, which cannot be easily deformed, curved or bent. As mentioned, the problem is typical of the large-dimension industrial fans, whereas the blades of fans having smaller dimensions can be manufactured with different and more flexible techniques, such as molding.

There is then a different problem, which concerns the large-dimension fans regardless of the technique with which the blades are made. During the life of the fans, the need can arise to have a greater flow rate than the one estimated during the design phase. In order to meet the requirement of greater flow rate, it may be necessary to redesign and in actual fact replace the fan, or at least the blades thereof, with evident costs. Modifying the pitch of the existing blades, in fact, may not be sufficient. For example, increasing the pitch angle entails a significantly higher aerodynamic drag and a corresponding increase in the required power, which the motor might not be capable of supplying. In any case, also the interventions for modifying the pitch are relatively long and complex and entail substantial costs if they have to be carried out on different machines.

Obviously, the problem is all the more important the more fans are installed in a plant, like in a condenser of a combined cycle power plant.

SUMMARY

It is thus an object of the present invention to provide a blade for an industrial axial fan and an industrial axial fan which allow overcoming or at least mitigating the described limitations and, in particular, enable improving the efficiency.

According to the present invention, a blade for an industrial axial fan is provided comprising:

an airfoil, having a leading edge, a trailing edge, a tip portion, an intrados and an extrados; and a tip lift appendage, applied to the tip portion of the airfoil and projecting beyond the trailing edge so as to form an extension of the airfoil in a downstream direction.

Practically, the tip lift appendage is configured to extend, limitedly to the tip portion, the lift surface of the airfoil and provide an additional flow rate contribution.

The tip lift appendage thus advantageously allows increasing the lift without a significant increase in the aerodynamic drag, which is confined to the end part of the blade. In other words, the benefit in terms of lift compensates and surpasses the effect of the greater drag and results, on the whole, in increased efficiency.

According to an aspect of the invention, the tip lift appendage is connected to the airfoil with a relative pitch angle with respect to the airfoil.

The relative pitch angle can be advantageously selected so as to optimize the efficiency of the blade and/or increase the flow rate obtainable with the same energy consumption.

According to an aspect of the invention, the tip lift appendage is connected to the airfoil so that the relative pitch angle is adjustable.

Thanks to the possibility of adjusting the pitch angle, the configuration can be easily optimized by simple tests on a model and then reproduced on the blades of fans of a same type and, if necessary, adapted in case the general configuration of the fan has varied (for example, for fans with a different number of blades). Furthermore, the configuration can be modified after the installation, should it be necessary.

According to an aspect of the invention, the tip lift appendage is hinge-connected to the airfoil with hinge axis oriented so that the relative pitch angle is modified on account of a rotation of the tip lift appendage about the hinge axis.

According to an aspect of the invention, the blade comprises an adjustment device configured to adjust the relative pitch angle between the tip lift appendage and the airfoil.

The utilization of a specially provided adjustment device enables selecting the configuration of the tip lift appendage not only in a simple and quick manner, but also in a precise and easily reproducible manner.

According to an aspect of the invention, the blade comprises a connecting structure, rigidly fixed to the airfoil and configured to connect the tip lift appendage to the airfoil and the tip lift appendage is hinge-connected to the connecting structure.

According to an aspect of the invention, the adjustment device comprises an adjustment member, defining an operative position of the tip lift appendage with respect to the connecting plate, and a contrast screw, blocking the tip lift appendage in the operative position defined by the adjustment screw.

According to an aspect of the invention, the adjustment device comprises a plurality of elastic elements packed between the connecting plate and the tip lift appendage by an adjustment screw, so that a tightening force of the adjustment screw determines a compression degree of the elastic elements and distance between the connecting plate and the tip lift appendage.

According to an aspect of the invention, the blade comprises a cover plate, extending toward the tip lift appendage, so as to connect the airfoil and the tip lift appendage without discontinuities.

The cover plate favors the flow preventing turbulences and load losses which could negatively affect the efficiency.

According to an aspect of the invention, the cover plate is elastic and preloaded against the tip lift appendage, so that a downstream edge of the cover plate is in contact with the tip lift appendage in each position of the tip lift appendage.

Thanks to the preload, the cover plate ensures a sufficiently regular surface for preventing vortexes harmful for the efficiency, regardless of the adjustment of the relative pitch angle.

According to an aspect of the invention, the tip lift appendage is rigidly fixed to the airfoil.

According to an aspect of the invention, the tip lift appendage is provided with a radially outer wall and with a radially inner wall extending perpendicular to the tip lift appendage toward the extrados and/or toward the intrados.

The side walls of the tip lift appendage reduce the losses for undesired passage of air between the side under pressure (intrados) and the side under depression (extrados) of the tip lift appendage. In fact, instead of contributing toward the lift, the flow between the side under pressure and the side under depression increases the drag of the blade and thus negatively affects the efficiency.

According to an aspect of the invention, the tip lift appendage has a radially outer edge aligned in continuation of a radially outer edge of the airfoil.

According to an aspect of the invention, a ratio between a dimension of the airfoil and an average dimension of the tip lift appendage in a radial direction is greater than 4.

According to an aspect of the invention, a ratio between a chord of the airfoil at the tip portion and a dimension in a tangential direction of the tip lift appendage is between 1 and 4.

The dimensional ratios between the airfoil and the tip lift appendage ensure that the overall efficiency of the blade is increased.

According to an aspect of the invention, the tip lift appendage comprises a lift plate.

According to an aspect of the invention, the tip lift appendage comprises a further airfoil.

According to an aspect of the invention, the airfoil is extruded or pultruded.

According to the present invention, an industrial axial fan comprising a hub rotatable about a rotation axis and a plurality of blades as defined above coupled to the hub are further provided.

BRIEF DESCRIPTION OF THE DRAWINGS

The present invention will now be described with reference to the accompanying drawings, which illustrate some non-limiting example embodiments thereof, wherein.

DESCRIPTION OF EMBODIMENTS

The invention described in the following is particularly suitable for manufacturing large-dimension axial fans, normally having a diameter not less than a meter. For example, the invention may be advantageously exploited for manufacturing heat exchangers utilized in natural gas liquefaction plants, refineries or combined cycle power plants or steam turbine power plants.

Figure 1:
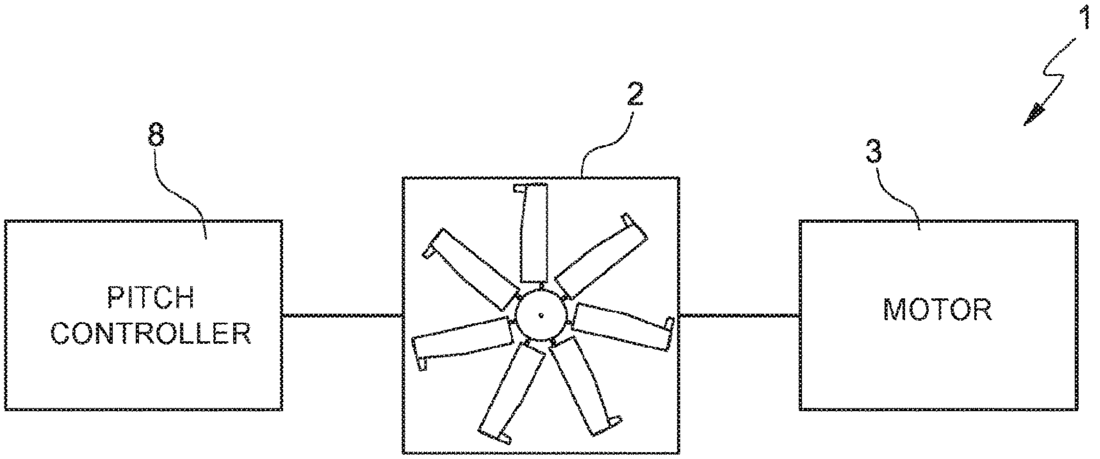
FIG. 1 is a simplified block diagram of an axial fan.

With reference to FIG. 1, a fan assembly, indicated as a whole by reference numeral 1, comprises an axial fan 2 actuated by an electric motor 3.

Figure 2:
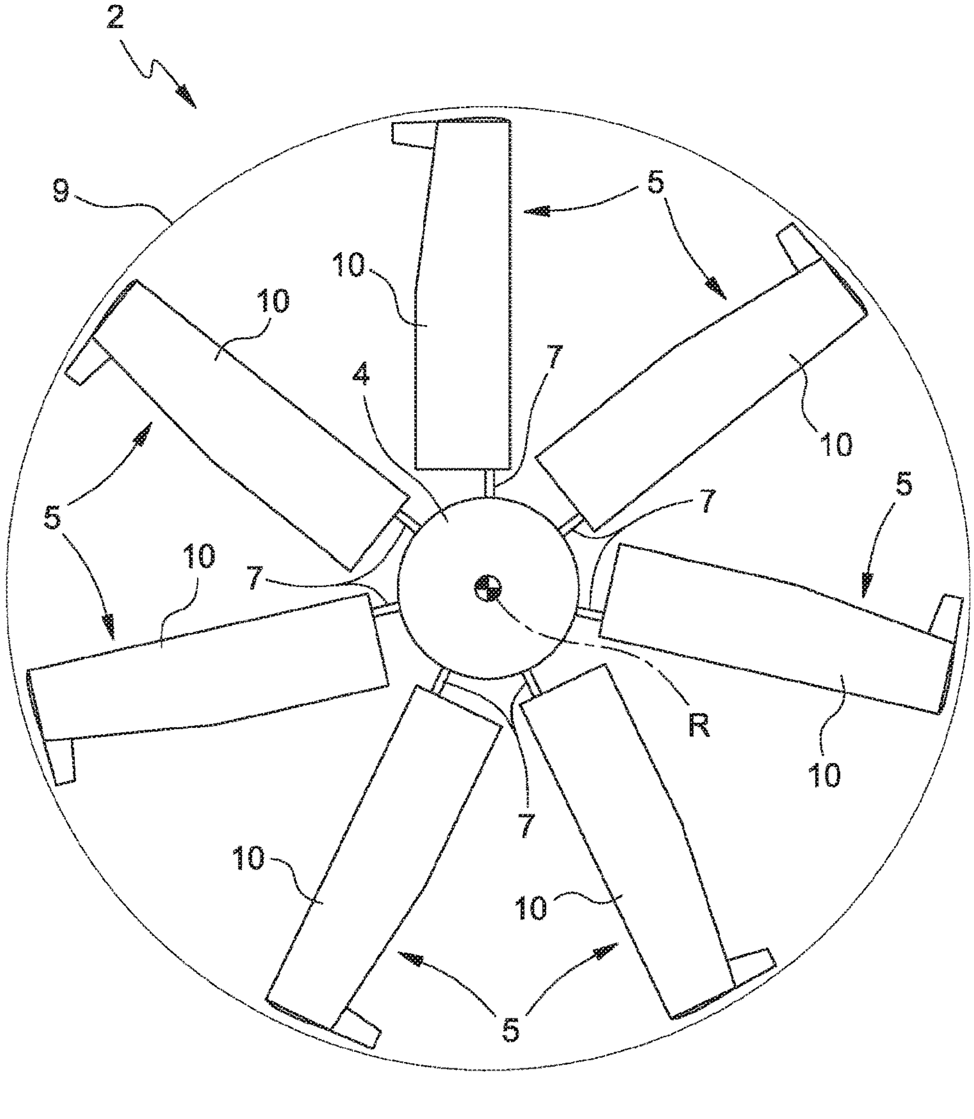
FIG. 2 is a top plan view of the axial fan of FIG. 1.

The axial fan 2, which is more specifically represented in FIG. 2, comprises a hub 4, connected to a shaft of the electric motor 3, and a plurality of blades 5 which extend from the hub 4 in a radial direction.

The blades 5 are made, for extrusion or pultrusion, for example of aluminum, of plastic material or of fiberglass-reinforced plastic. The blades 5 are further connected to the hub 4 by respective rods 7. In an embodiment, the rods 7 are orientable about respective longitudinal axes for enabling adjusting a pitch angle of the blades 5 by a specially provided controller 8 (FIG. 1). A containment ring 9 is schematically illustrated in FIG. 2.

Figure 3:
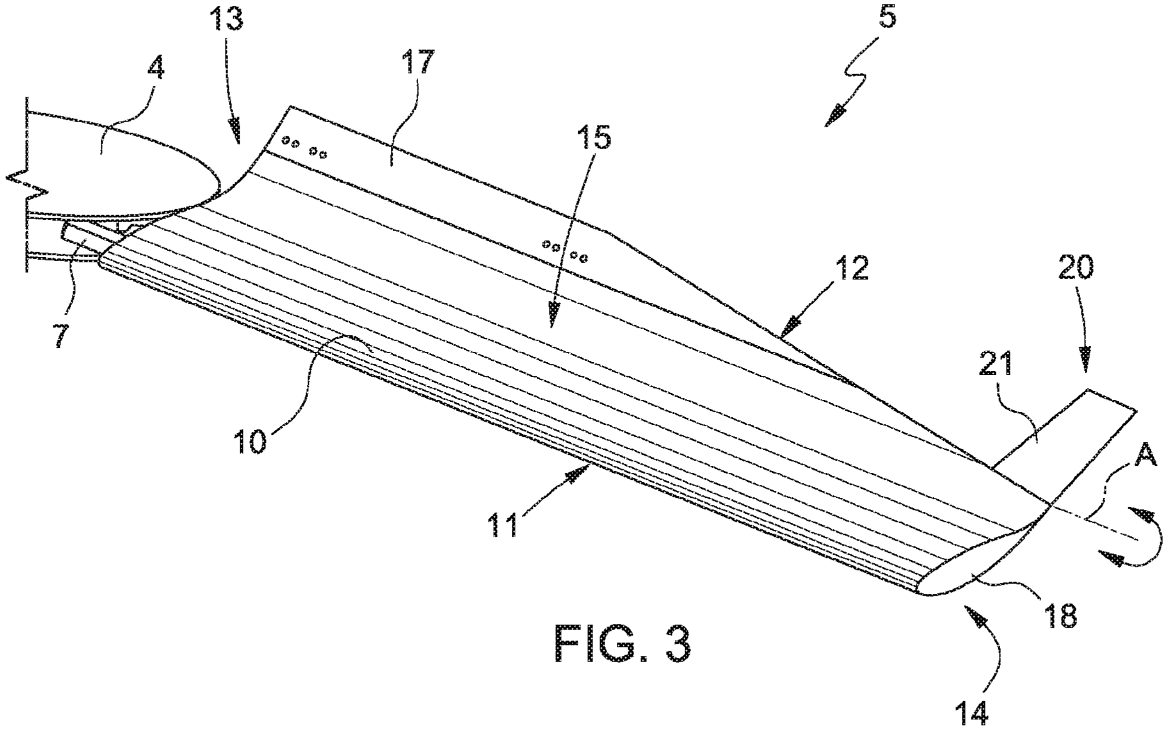
FIG. 3 is an enlarged top perspective view of a blade of the fan of FIG. 1, in accordance with an embodiment of the present invention.
Figure 4:
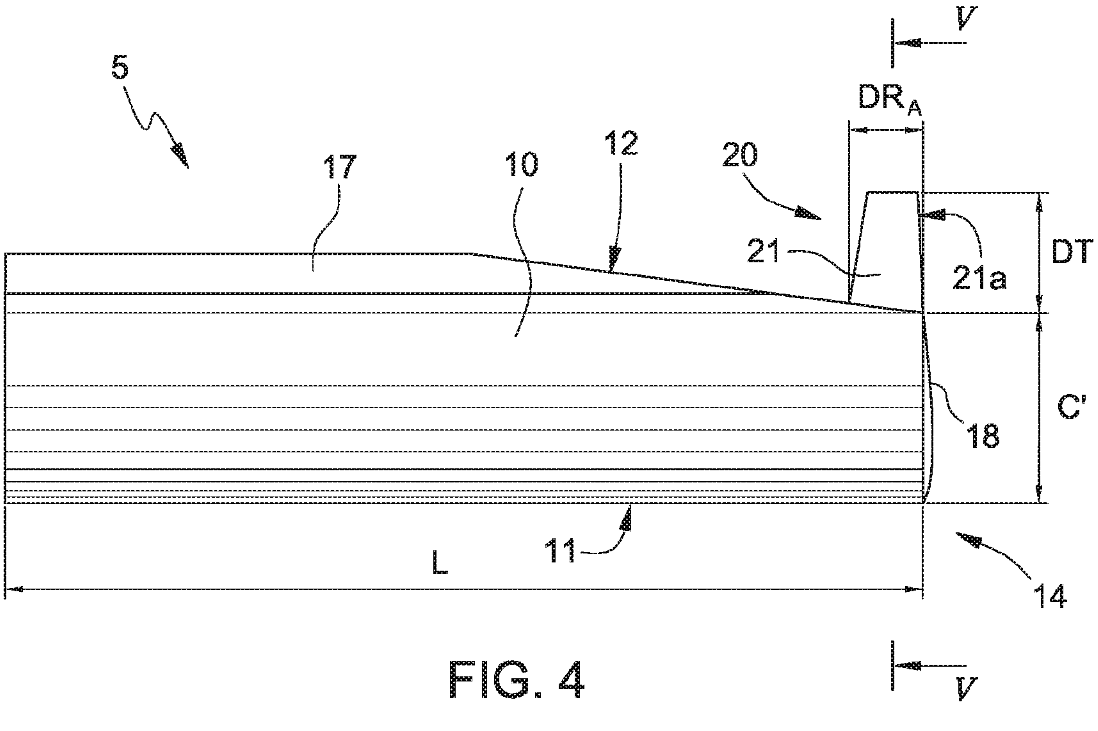
FIG. 4 is a top plan view of the blade of FIG. 3.
Figure 5:
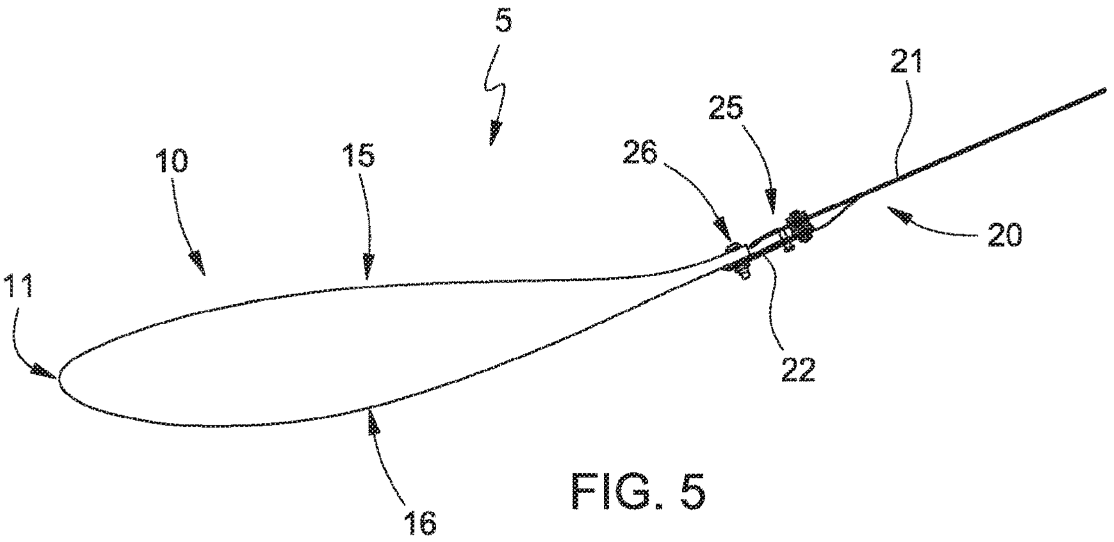
FIG. 5 is a side view of the blade of FIG. 3, sectioned along trace plane V-V of FIG. 4.

As is shown also in FIGS. 3-5, each blade 5 comprises an extruded or pultruded airfoil 10, having a leading edge 11, a trailing edge 12, a root portion 13, a tip portion 14, an intrados 15 and an extrados 16. In a different embodiment, not illustrated, the airfoil may be manufactured with a different technique, for example by molding. A flap 17 extends from the root portion along the trailing edge 12, whereas an end element 18 is arranged closing the tip portion 14. The flap 17 may be defined by a foil portion extruded with the airfoil 10 and cut or by an additional airfoil extruded separately and connected to the airfoil 10 so as to enable the passage of a fluid vein between the airfoil 10 and the flap 17.

The blade 5 further comprises a tip lift appendage 20, applied to the tip portion of the airfoil 10 and projecting beyond the trailing edge 12 so as to form an extension of the airfoil 10 in a downstream direction, a connecting plate 22, a cover plate 23 and an adjustment device 25.

Figure 6:
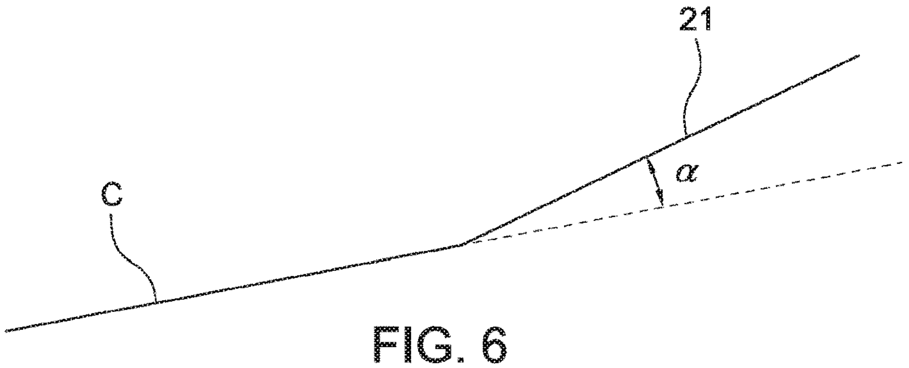
FIG. 6 is a schematic representation of magnitudes relative to the blade of FIG. 3.

The tip lift appendage 20 is defined by a flat or curved lift plate and is connected to the tip portion 14 of the airfoil 10 by the connecting plate 22 with a relative pitch angle (with respect to the airfoil 10 (FIG. 6). The relative pitch angle (can be defined as the (acute) angle between the chord C of the airfoil 10 in the tip portion 14, where the tip lift appendage 20 is applied, and the tip lift appendage 20.

The tip lift appendage 20 may have a generally quadrangular shape, for example rectangular or trapezoidal, with straight sides, as in the example of FIGS. 3 and 4 or curvilinear sides. For example, a radially outer side and a radially inner side may be curved. Furthermore, in an embodiment, the radially outer edge of the tip lift appendage 20 is aligned in continuation of a radially outer edge of the airfoil 10.

A ratio between a dimension L of the airfoil 10 and an average dimension DRA of the tip lift appendage 20 in a radial direction (FIG. 4) is preferably greater than 4. Furthermore, a ratio between a chord C' of the airfoil 10 at the tip portion 14 and a dimension in a tangential direction DT of the tip lift appendage 20 is preferably between 1 and 4.

The connection of the tip lift appendage 20 to the airfoil 10 enables adjusting the relative pitch angle α. More precisely, the connecting plate 22 is rigidly connected to the tip portion 14 of the airfoil 10, in particular to the extrados 16, for example by screws 26 or rivets or a structural adhesive (not shown), and the tip lift appendage 20 is hinge-connected to the connecting plate 22, with hinge axis A oriented so that the relative pitch angle (is modified on account of a rotation of the tip lift appendage 20 about the hinge axis A. For example, the hinge axis A may be substantially parallel to the leading edge 11 or to the trailing edge 12. In an embodiment not shown, the connecting plate is further connected to the intrados of the airfoil.

Figure 7:
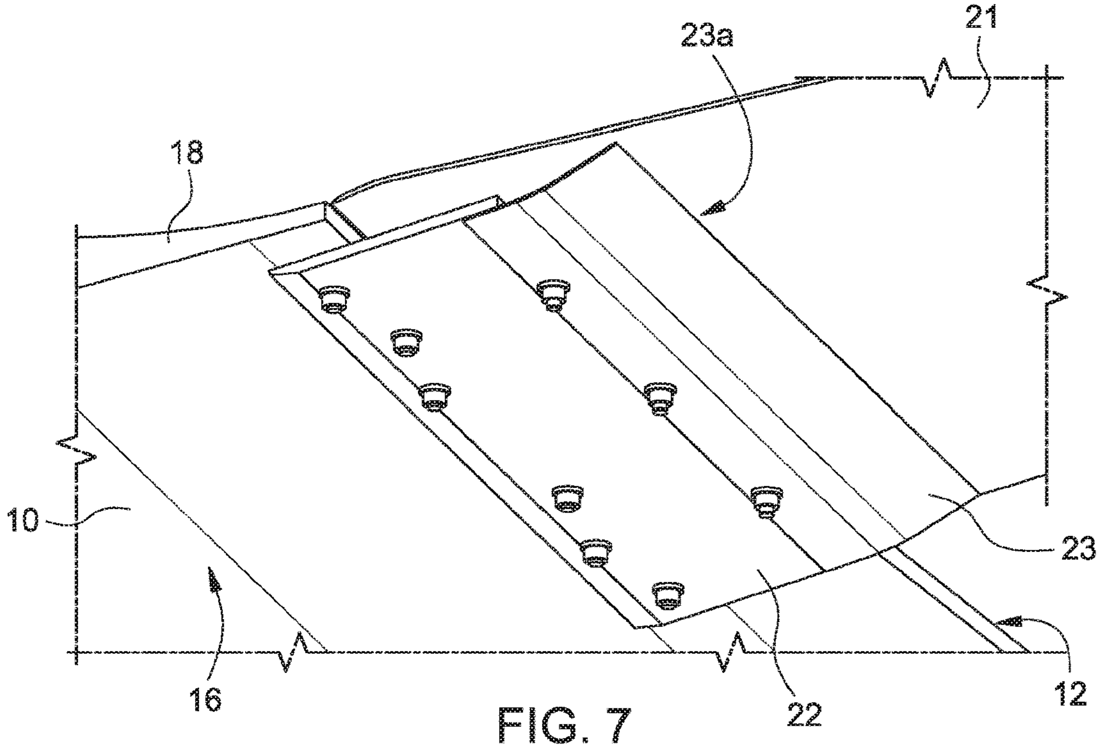
FIG. 7 is an enlarged bottom perspective view of a portion of the blade of FIG. 3.

With reference to FIG. 7, the cover plate 23 extends from the connecting plate 22 toward the tip lift appendage 20, so as to close an interspace 35 between the connecting plate 22 and the tip lift appendage 20 without discontinuities. The cover plate 23 is elastic and is preloaded against the tip lift appendage 20, so that a downstream edge 23*a* of the cover plate is in contact with the tip lift appendage 20 in each position of the tip lift appendage 20 enabled by the adjustment device 25.

Figure 8:
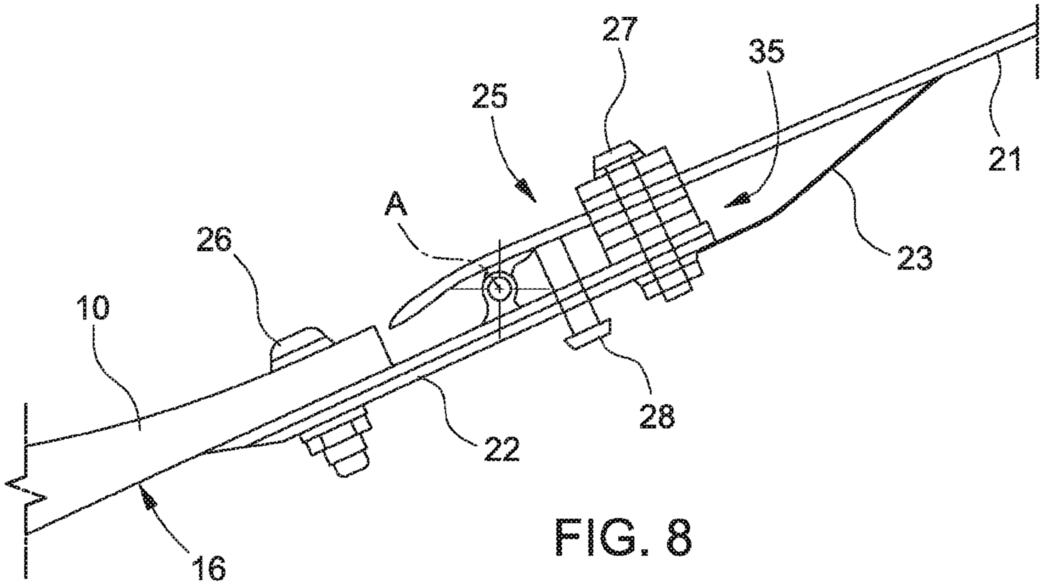
FIG. 8 is an enlarged side view of a detail of the blade of FIG. 3.

The adjustment device 25 is configured to adjust the relative pitch angle (between the tip lift appendage 20 and the airfoil 10 and to block the tip lift appendage 20 in an operative position. In an embodiment, illustrated in FIG. 8, the adjustment device 25 comprises an adjustment screw 27 and a contrast screw 28. The adjustment screw 27 determines the relative pitch angle (and the operative position of the tip lift appendage 20 with respect to the connecting plate 22, whereas the contrast screw 28 is tightened for blocking the tip lift appendage 20 in the operative position defined by the adjustment screw 27. The adjustment screw 27 may be replaced by another suitable adjustment member, for example a cam.

Figure 9:
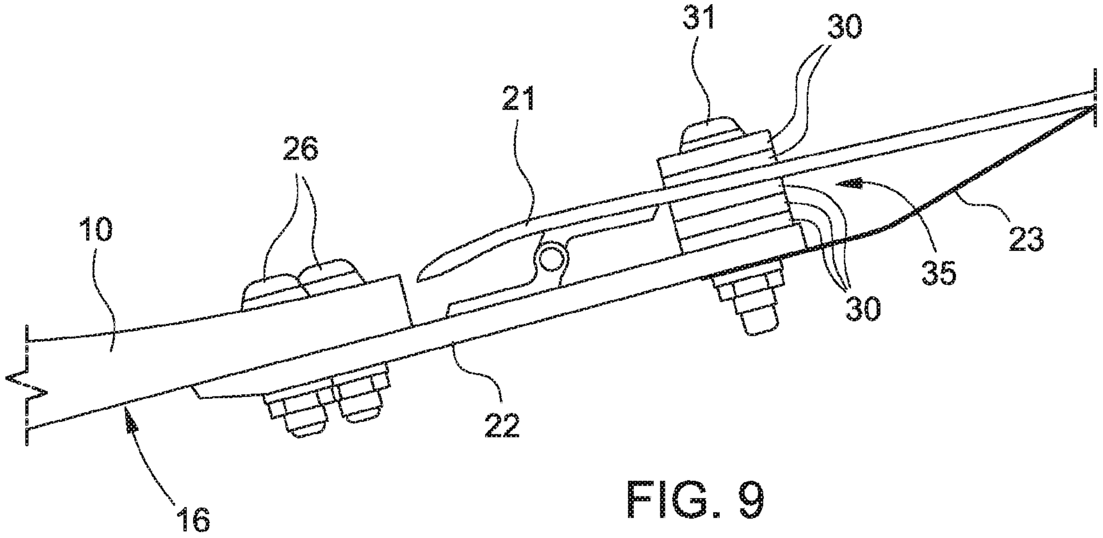
FIG. 9 is an enlarged side view of a detail of a blade of an axial fan in accordance with a different embodiment of the present invention.

In a different embodiment (FIG. 9), the adjustment device 25 comprises a plurality of elastic elements 30, for example disks, packed between the connecting plate 22 and the tip lift appendage 20 by an adjustment screw 31, so that a tightening force of the adjustment screw 31 determines a compression degree of the elastic elements 30 and a distance between the connecting plate 22 and the tip lift appendage 20. Also the relative pitch angle (results thus determined. However, it is understood that it is possible to use any adjustment device which allows modifying the position of the tip lift appendage 20 with respect to the connecting plate 22 so as to vary the relative pitch angle α.

Figure 10:
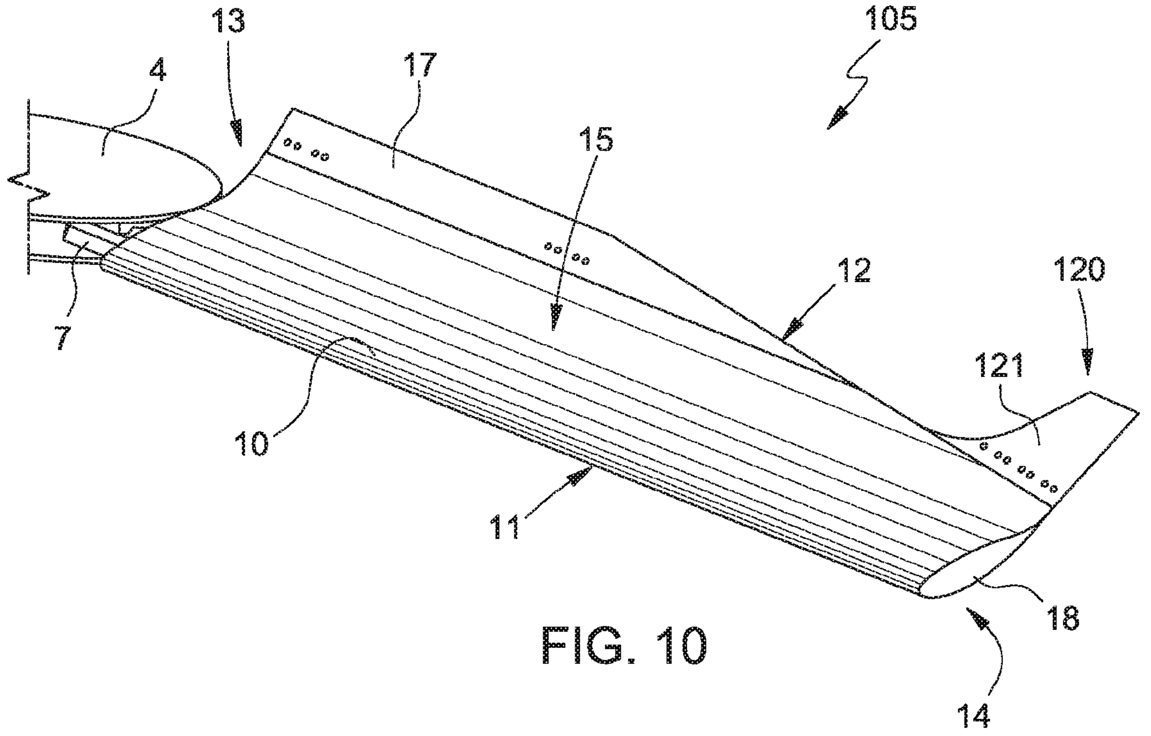
FIG. 10 is a top perspective view of a blade of an axial fan in accordance with another embodiment of the present invention.
Figure 11:
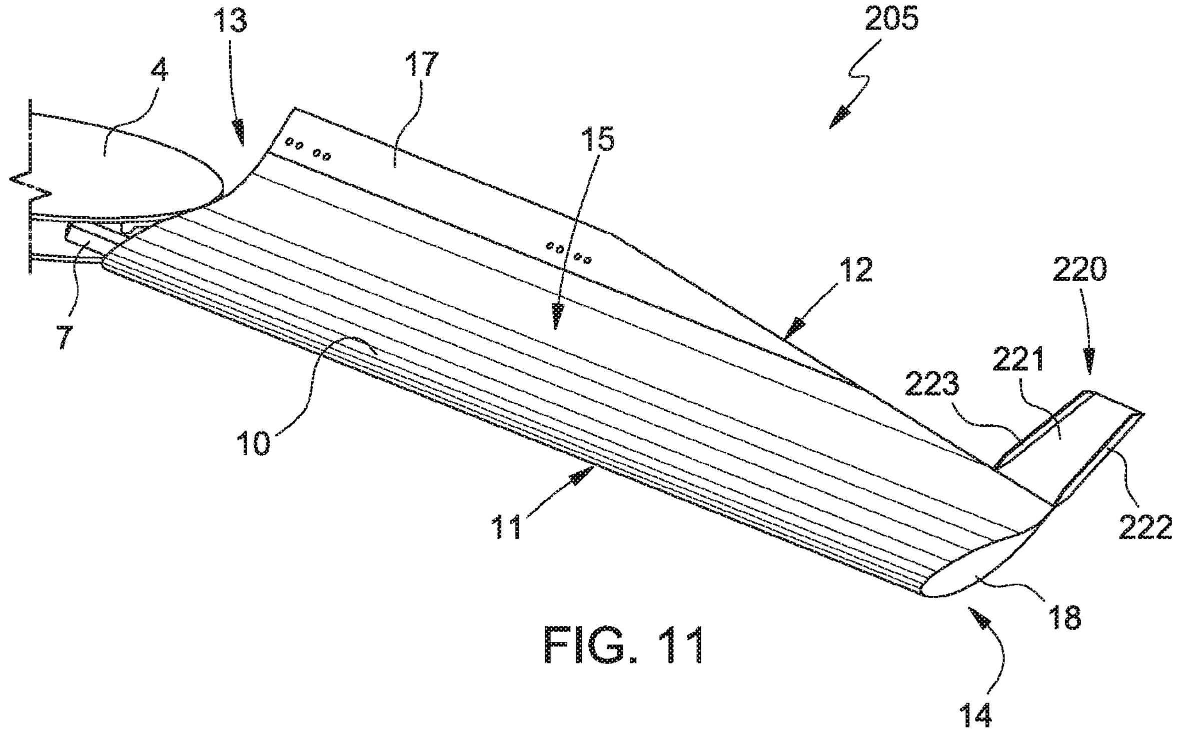
FIG. 11 is a top perspective view of a blade of an axial fan in accordance with a further embodiment of the present invention.
Figure 12:
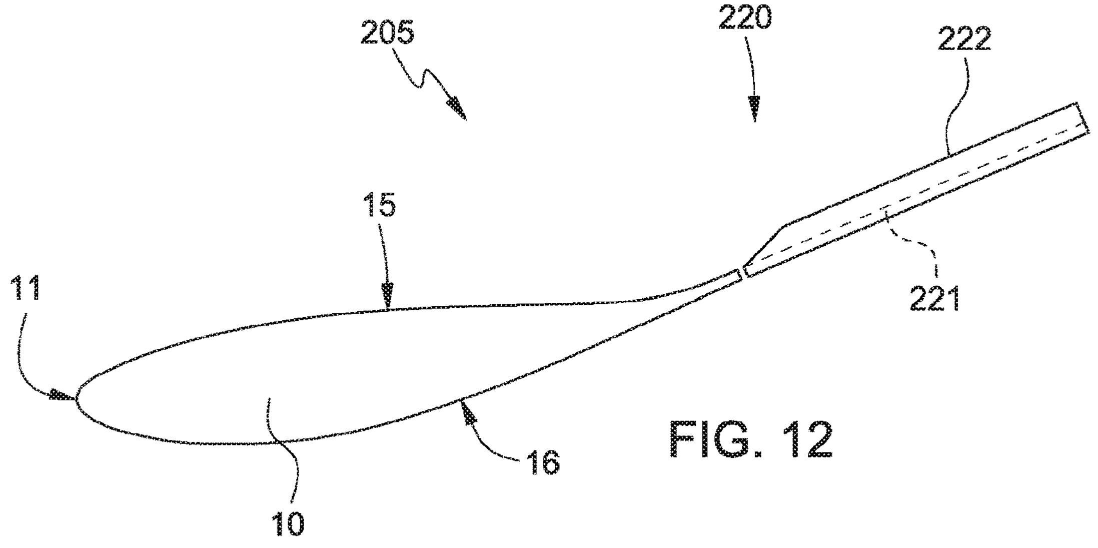
FIG. 12 is a side view of the blade of FIG. 11.
Figure 13:
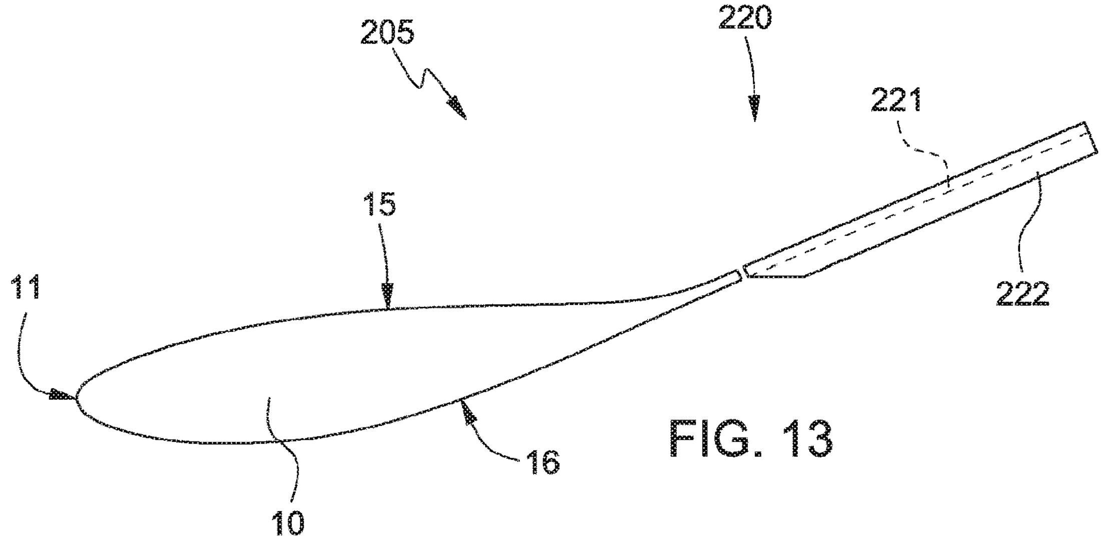
FIG. 13 is a side view of a blade of an axial fan in accordance with a further embodiment of the present invention.

According to an embodiment illustrated in FIG. 10, wherein parts identical to those already shown are indicated by the same reference numerals, a blade 105 for a large-dimension axial fan has a tip lift appendage 120 defined by a lift plate rigidly fixed to the airfoil 10, for example to the extrados 16. In this case, a radially inner edge of the lift plate is curved, for example parabolic or hyperbolic.

Figure 14:
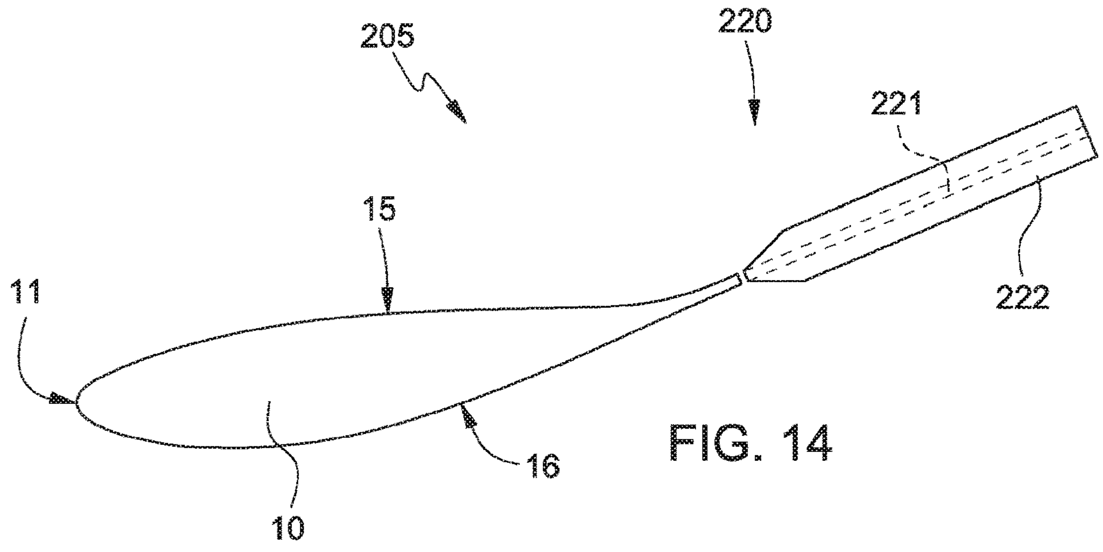
FIG. 14 is a side view of a blade of an axial fan in accordance with yet another embodiment of the present invention.

In the embodiments illustrated in FIGS. 11-14, the tip lift appendage, indicated here by 220, of a blade 205 is provided with a radially outer wall 222 and with a radially inner wall 223. The walls 222, 223 can extend perpendicular to the tip lift appendage 20 both toward the intrados 15 (FIGS. 11 and 12), and toward the extrados 16 (FIG. 13), as well as in both directions (FIG. 14). Furthermore, the walls 222, 223 can be utilized both with an adjustment device, as in the case of the adjustable tip lift appendage 20 of FIGS. 3-9, and in case the tip lift appendage 120 is fixed with respect to the airfoil, as in the case of FIG. 10.

Figure 15:
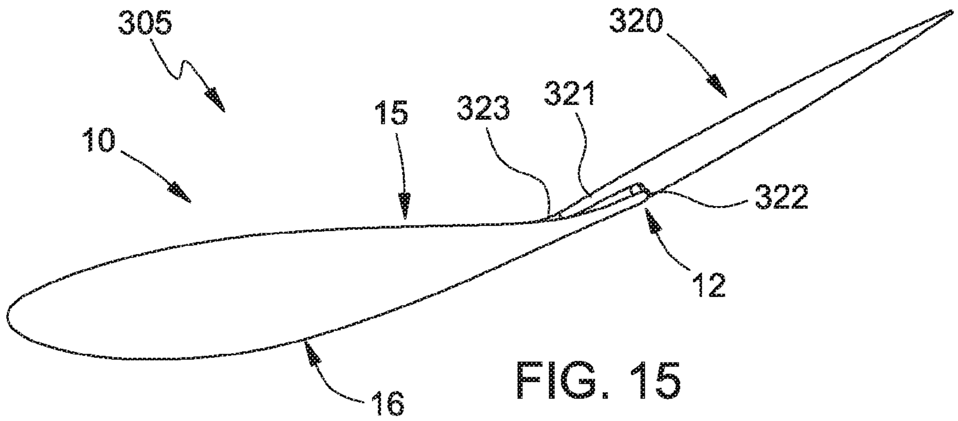
FIGS. 15 and 16 are side views of a blade of an axial fan in accordance with a further embodiment of the present invention in respective operative configurations.
Figure 16:
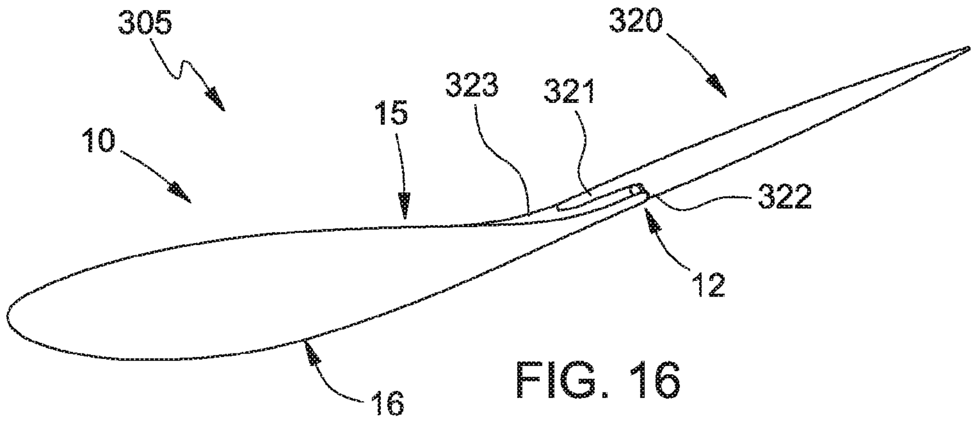
Figure 17:
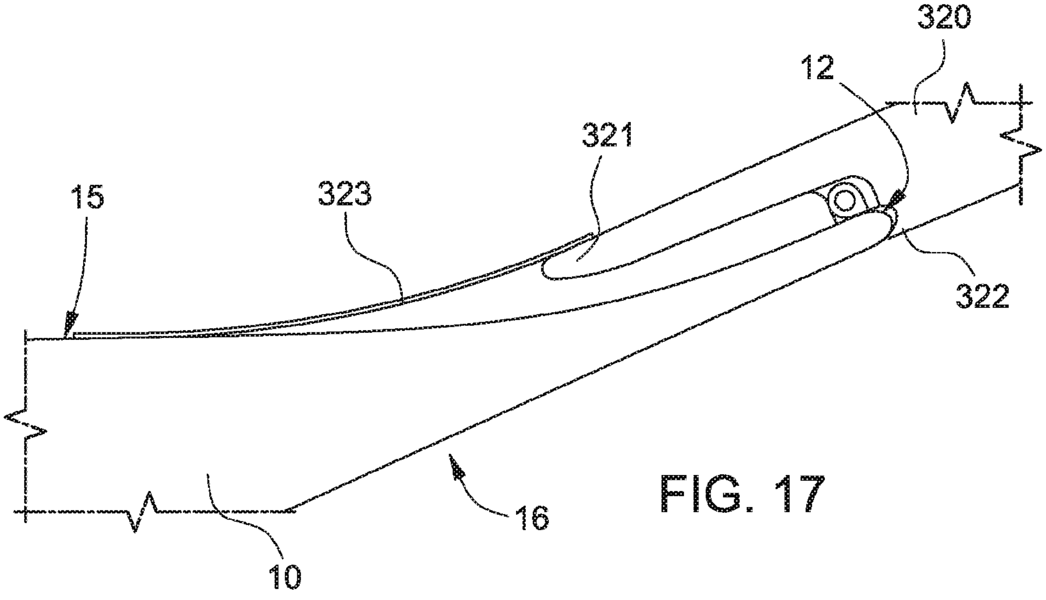
FIG. 17 shows an enlarged detail of the blade in the operative configuration of FIG. 16.

With reference to FIGS. 15-17, in an embodiment, a blade 305 for a large-dimension axial fan has a tip lift appendage 320 defined by a further airfoil hinge-connected for example to the intrados 16. In this case, an upstream portion of the tip lift appendage 320 is superimposed on the trailing edge 12 and on a downstream portion of the airfoil 10. An adjustment device, not shown here, allows adjusting the relative pitch angle between the airfoil 10 and the tip lift appendage 320, for example between a first operative configuration, wherein a first end-of-stroke portion 321 defined by an upstream edge of the tip lift appendage 320 is in contact with the intrados 15 of the airfoil 10, and a second operative configuration, wherein a second end-of-stroke portion 322 is in contact with the trailing edge 12 of the airfoil 10.

A cover plate 323 connects the tip lift appendage 320 to the intrados 15 of the airfoil 10 so as to define a regular surface and prevent turbulences. The cover plate 323 is elastic and is preloaded against the tip lift appendage 320 so as to maintain the contact in all the admitted operative configurations of the tip lift appendage 320.

In a different embodiment not shown, the tip lift appendage 320 can be connected to the airfoil 10 by a connecting plate. More precisely, the connecting plate is rigidly connected to the intrados 15 and/or to the extrados 16 of the airfoil 10 and the tip lift appendage 320 is hinge-connected to the connecting plate.

Finally, it is evident that modifications and variations can be made to the described axial fan, without departing from the scope of the present invention, as defined in the appended claims.

In particular, the connecting plate may not be utilized or may be replaced by a bracket or by another connecting structure adapted to connect the tip lift appendage to the airfoil. The connection can finally be rigid or with pitch angle adjustable according to the design preferences. If the relative pitch angle is adjustable, the connecting structure supports the adjustment device of the relative pitch angle.

In all the described embodiments, the tip lift appendage can be defined as much by a lift plate, as by an airfoil, according to the design preferences.

The diameter and the number of the blades of the axial fan can vary with respect to what described.

The connection between the blades and the hub can also differ from what described. Moreover, the blades can be connected to the hub with fixed pitch angle.

Furthermore, the blades can be unprovided with end elements, for example if not required for a specific application.

The invention claimed is:

1. A blade for an industrial axial fan comprising:
- an airfoil having a leading edge, a trailing edge, a tip portion, an intrados and an extrados; and
- a tip lift appendage applied to the tip portion of the airfoil and projecting beyond the trailing edge so as to form an extension of the airfoil in a downstream direction,
- wherein the tip lift appendage is hinge-connected to the airfoil with a hinge axis orientated so that a relative pitch angle is adjustable and modified on account of a rotation of the tip lift appendage about the hinge axis.

2. The blade according to claim 1, wherein the tip lift appendage is rigidly fixed to the airfoil.

3. The blade according to claim 1, wherein the tip lift appendage is provided with a radially outer wall and with a radially inner wall extending perpendicular to the tip lift appendage toward the extrados and/or toward the intrados.

4. The blade according to claim 1, wherein the tip lift appendage has a radially outer edge aligned in continuation of a radially outer edge of the airfoil.

5. The blade according claim 1, wherein a ratio between a dimension of the airfoil and an average dimension of the tip lift appendage in a radial direction is greater than 4.

6. The blade according to claim 1, wherein a ratio between a chord of the airfoil at the tip portion and a dimension in a tangential direction of the tip lift appendage is between 1 and 4.

7. The blade according to claim 1, wherein the tip lift appendage comprises a lift plate.

8. The blade according to claim 1, wherein the tip lift appendage comprises a further airfoil.

9. The blade according to claim 1, wherein the airfoil is extruded or pultruded.

10. An industrial axial fan, comprising a hub rotatable about a rotation axis and a plurality of blades according to claim 1 coupled to the hub.

11. A blade for an industrial axial fan, comprising:
- an airfoil having a leading edge, a trailing edge, a tip portion, an intrados and an extrados;
- a tip lift appendage connected to the tip portion of the airfoil with a relative pitch angle that is adjustable, and projecting beyond the trailing edge so as to form an extension of the airfoil in a downstream direction; and
- an adjustment device configured to adjust the relative pitch angle between the tip lift appendage and the airfoil.

12. The blade according to claim 11, comprising a connecting structure, rigidly fixed to the airfoil and configured to connect the tip lift appendage to the airfoil, wherein the tip lift appendage is hinge-connected to the connecting structure.

13. The blade according to claim 12, wherein the adjustment device comprises an adjustment member, defining an operative position of the tip lift appendage with respect to the connecting structure, and a contrast screw, blocking the tip lift appendage in the operative position defined by the adjustment member.

14. The blade according to claim 12, wherein the adjustment device comprises a plurality of elastic elements packed between the connecting structure and the tip lift appendage by an adjustment screw, so that a tightening force of the adjustment screw determines a compression degree of the elastic elements and a distance between the connecting structure and the tip lift appendage.

15. The blade according to claim 11, comprising a cover plate, extending toward the tip lift appendage, so as to connect the airfoil and the tip lift appendage without discontinuities.

16. The blade according to claim 15, wherein the cover plate is elastic and is preloaded against the tip lift appendage, so that a downstream edge of the cover plate is in contact with the tip lift appendage in each position of the tip lift appendage.

* * * * *